(12) United States Patent
Lundquist

(10) Patent No.: US 8,010,253 B2
(45) Date of Patent: Aug. 30, 2011

(54) METHOD FOR STABILIZING A VEHICLE COMBINATION

(75) Inventor: Christian Lundquist, Linkoeping (SE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 601 days.

(21) Appl. No.: 12/012,631

(22) Filed: Feb. 5, 2008

(65) Prior Publication Data

US 2008/0196964 A1 Aug. 21, 2008

(30) Foreign Application Priority Data

Feb. 20, 2007 (DE) .......... 10 2007 008 342

(51) Int. Cl.
A01B 69/00 (2006.01)
(52) U.S. Cl. .................. 701/41; 180/443
(58) Field of Classification Search ............ 701/41, 701/42; 180/315, 443; 318/432; 303/124, 303/140, 186

See application file for complete search history.

(56) References Cited

U.S. PATENT DOCUMENTS

| 5,828,972 | A | 10/1998 | Asanuma et al. | |
| 2005/0273235 | A1* | 12/2005 | Ohta et al. | 701/41 |
| 2006/0047391 | A1* | 3/2006 | Katou | 701/41 |
| 2006/0125313 | A1* | 6/2006 | Gunne et al. | 303/7 |

FOREIGN PATENT DOCUMENTS

| DE | 22 56 455 | 6/1974 |
| DE | 41 27 750 | 9/1992 |
| DE | 42 32 256 | 4/1993 |
| DE | 198 43 826 | 3/2000 |
| DE | 100 30 128 | 1/2002 |
| DE | 100 34 222 | 1/2002 |
| DE | 103 42 865 | 4/2005 |

* cited by examiner

*Primary Examiner* — Gertrude Arthur Jeanglaud
(74) *Attorney, Agent, or Firm* — Jordan and Hamburg LLP

(57) ABSTRACT

A method of stabilizing a vehicle combination including a towing vehicle and a trailer, includes determining at least one vehicle state variable describing the state of the vehicle from a comparison with an assigned nominal value. A correcting variable is produced, which is supplied to an actuator in the vehicle. The correcting variable acts upon a steering actuator in order to adjust the wheel steering angle.

20 Claims, 4 Drawing Sheets

METHOD FOR STABILIZING A VEHICLE COMBINATION

BACKGROUND OF THE INVENTION

The invention relates to a method for stabilizing a vehicle combination, comprising a towing vehicle and a trailer.

For stabilizing truck and trailer combinations, which include a towing vehicle and a trailer hitched by a tow bar, DE 100 30 128 A1 discloses detecting differences between the course desired by the driver and the actual movement of the vehicle by means of sensing technology in the towing vehicle, and, thereupon, to braking individual wheels of the trailer axle in order to avoid dynamic driving instabilities by these means. As a result of braking the trailer, the vehicle combination extends, reducing the danger of jackknifing between the towing vehicle and the trailer.

SUMMARY OF THE INVENTION

Starting out from this state of the art, it is an object of the invention to stabilize a vehicle combination, which comprises a towing vehicle and a trailer, with simple means. This is to be accomplished basically without activating the braking system of the vehicle combination.

Pursuant to the invention, this objective is accomplished by an approach which includes determining an actual value of at least one vehicle state variable describing a state of the vehicle and comparing the actual value of the at least one vehicle state variable with a nominal value of the at least one vehicle state variable corresponding thereto. A correcting variable is produced based on the comparing which is supplied to a steering actuator in the vehicle, and the correcting variable is made to act upon a steering actuator for changing a relevant setting thereof based on the comparing and adjusting a wheel steering angle accordingly at least at one steerable wheel of the vehicle.

For the method of stabilizing the vehicle combination in accordance with the invention, at least one vehicle control variable, describing the driving state, is determined, either by measurement or by calculation, for example, with the help of an observer, and is used as a basis for a comparison with an assigned nominal value. From this comparison, a vehicle control variable is produced, which is supplied to an actuator in the vehicle for changing the current setting. Pursuant to the invention, provisions are made so that the control variable acts upon a steering actuator, as a result of which the angle of the steering wheel is changed at least at one steerable wheel of the vehicle.

In the case of a threatening instability of the vehicle composite or of one that has already taken place, stabilization can be carried out in this way solely by affecting the steering. Additional stabilizing measures may be provided in the vehicle. However, they are not necessarily required for avoiding rolling motion of the vehicle combination. For example, it may be appropriate to intervene in the braking process and/or in the engine control in addition to affecting a steering. In principle, however, intervening in the steering is sufficient for the stabilization.

Intervention in the steering is accomplished basically over the steerable wheels of the towing vehicle. Alternatively or additionally, it is, however, also possible to intervene in the steering at the trailer, provided that the latter has steerable wheels.

In particular, the yaw rate is called upon as vehicle control variable, which can be affected as a process variable. Additionally or alternatively, the trailer angle, which describes the angular deviation between the longitudinal axes of the towing vehicle and of the trailer, can also be taken into consideration as a process variable. In general, any vehicle state variable, from which information concerning the transverse dynamics of the vehicle can be inferred, comes into consideration as a process variable, that is, any vehicle state variables or a combination hereof related to the transverse dynamics of the vehicle. This may optionally also be the steering angle, the transverse velocity or the transverse acceleration or the angular velocity difference at the wheels of the vehicle.

Linear, as well as nonlinear, control formulations can be used for the control, which is required for stabilizing the vehicle combination. Since the vehicle-trailer model, which forms the basis for the control as a mathematical replacement model, is nonlinear, a linearization about a defined operating point is required for use as a linear controller. However, the use of nonlinear controls, for example, of compensation controllers (also known as feedback or feedback linearization) which is based on the fundamental principle of an inverse vehicle model, is also possible. If the quality of the model is adequate, the real behavior of the vehicle is compensated for by the model and a linear control relationship results.

It may also be appropriate to provide a limit before and/or after the controller, in order, on the one hand, to let differences between the nominal value and the actual value be effective only for the case in which the difference exceeds a relevant threshold, and, on the other, to provide a lid for the difference between the nominal and actual values at a maximum value, in order to avoid excessively large control interventions. For a limiter downstream from the controller, the magnitude of the control interventions is limited to a maximum value.

The difference between the nominal and actual values, which are to be supplied to the controller, may optionally be subjected to integration, in order to take the dynamics of the driving behavior into consideration by these means. This can be accomplished by adapting the limits in the limiter. For example, if the vehicle is unstable over a certain period of time, the limit can be reduced, so that the control algorithm is run through more frequently and engages with a larger amplitude. Conversely, the limit can be increased if the vehicle, including the trailer, runs stably for a minimum period of time.

Advantageously, the limit is related to the difference between the nominal value and the actual value of the vehicle control variable under consideration. In order to establish the magnitude of the limit of the vehicle control value in question, further vehicle state variables and/or parameters may flow in. For example, the attitude angle, the tire forces or the maximum friction may flow into the limit.

The method is realized in a steering system, which has at its disposal at least one device for manipulating the steering, usually a steering wheel, a steering linkage and a steering actuator, the steering angle, specified by the device for manipulating the steering being converted with the help of the steering linkage onto the steerable wheel of the vehicle and the steering actuator producing a supporting moment. Alternatively or additionally to a supporting moment, it is also possible, in the case of an embodiment as active steering system, to specify a superimposing steering angle, which is superimposed on the steering angle desired by the driver. Basically, the method is suitable for use in an EPS steering system (electrical power steering) with an electric motor as steering actuator. However, other steering systems, such as an electrohydraulic steering system, also come into consideration.

Further advantages and appropriate embodiments are given in the description of the Figures and the drawings.

DETAILED DESCRIPTION OF THE INVENTION

Figure 1:
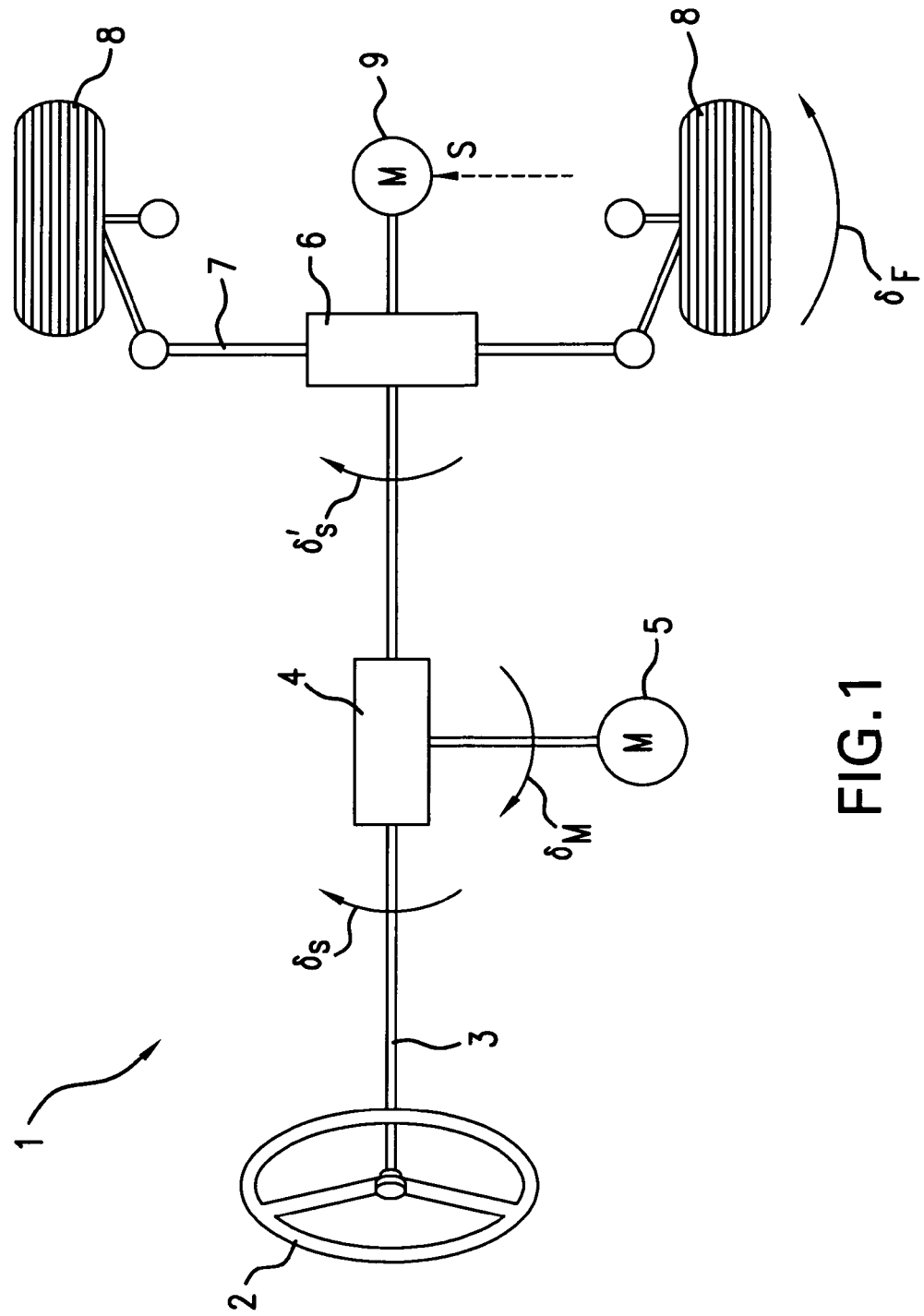
FIG. 1 shows a diagrammatic representation of a steering system in a vehicle with a steering gear, which is preceded by a superimposing gear.

A steering system 1 in a motor vehicle, shown in diagrammatic representation in FIG. 1, comprises a device for manipulating the steering, which is constructed as a steering wheel 2, a steering shaft 3, which is connected with the steering wheel 2, a steering gear 6 with a steering actuator 9 and a steering linkage 7, which is connected with the steerable front wheels 8. The steering angle $\delta_S$, specified by the driver over the steering wheel 2, is transferred over the steering shaft 3 and the steering gear 6 into a gear rack travel of the steering linkage 7, as a result of which a wheel steering angle $\delta_F$ is set in the steerable front wheels 8. Depending on the situation, a motor correcting moment can be fed over the steering gear 6 into the steering system to support the steering over the steering actuator 9, which preferably is constructed as an electric motor. Instead of being constructed as an electric motor, a steering actuator 9 can also be constructed as an electrohydraulic control element.

Furthermore, the steering system 1 has a superimposing steering gear 4 with a servo motor 5, the superimposing gear 4 being interposed in the steering shaft 3. When the servo motor 5 is actuated, a superimposing steering angle $\delta_M$ is produced, which is superimposed on the steering angle $\delta_S$, produced by the driver, to form the resulting steering angle $\delta'_S$. No superimposing steering angle $\delta_M$ is produced when the servo motor is not in operation. In this case, the steering angle $\delta_S$ produced by the driver is supplied directly to the steering gear 6 as an input quantity.

It is also possible to do without the superimposing gear 4 including the servo motor 5.

The steering actuator 9 is adjusted by means of a correcting variable S, which is produced in a regulating or controlling device, through which the method for stabilizing a vehicle combination passes. The correcting variable S adjusts the steering actuator 9 and, with that, brings about the desired setting of the front wheel angle $\delta_F$.

Figure 2:
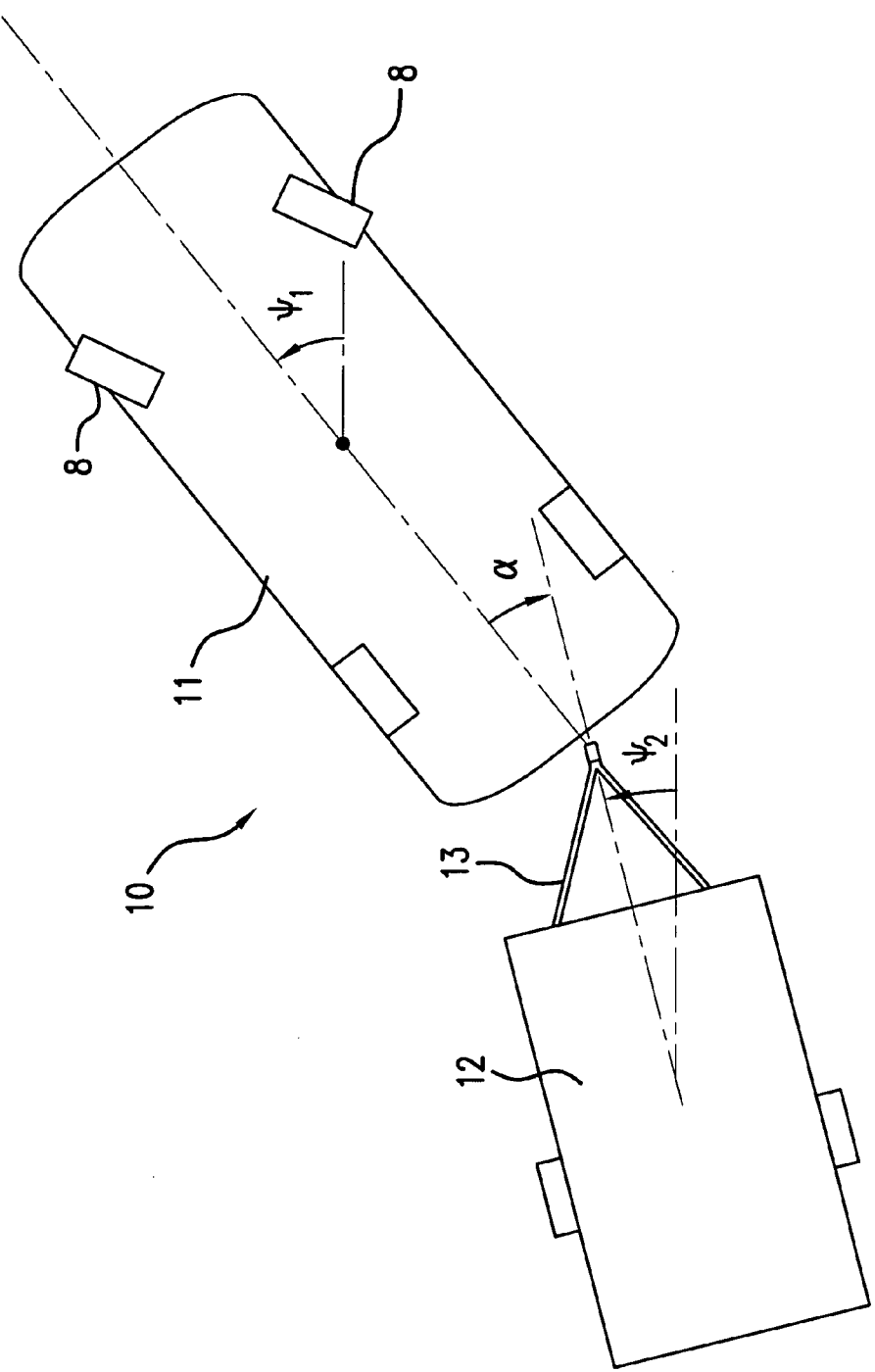
FIG. 2 shows a diagrammatic view of a vehicle combination, consisting of a towing vehicle and a trailer, a steering system of FIG. 1 being realized in the towing vehicle.

FIG. 2 shows a vehicle combination 10, which consists of a towing vehicle 11 and a trailer 12, which is coupled pivotably over a fixed tow bar 13 to the towing vehicle 11. The front wheels 8 of the towing vehicle 11 are constructed to be steerable. The angles $\Psi_1$, $\Psi_2$ and $\gamma$, of which $\Psi_1$ and $\Psi_2$ represent the yaw angle of the towing vehicle 11 or of the trailer 12 and $\gamma$ represents the trailer angle, which represents the angular deviation between the longitudinal axis of the trailer 12 and the longitudinal axis of the towing vehicle 11, are entered in FIG. 2.

Figure 3:
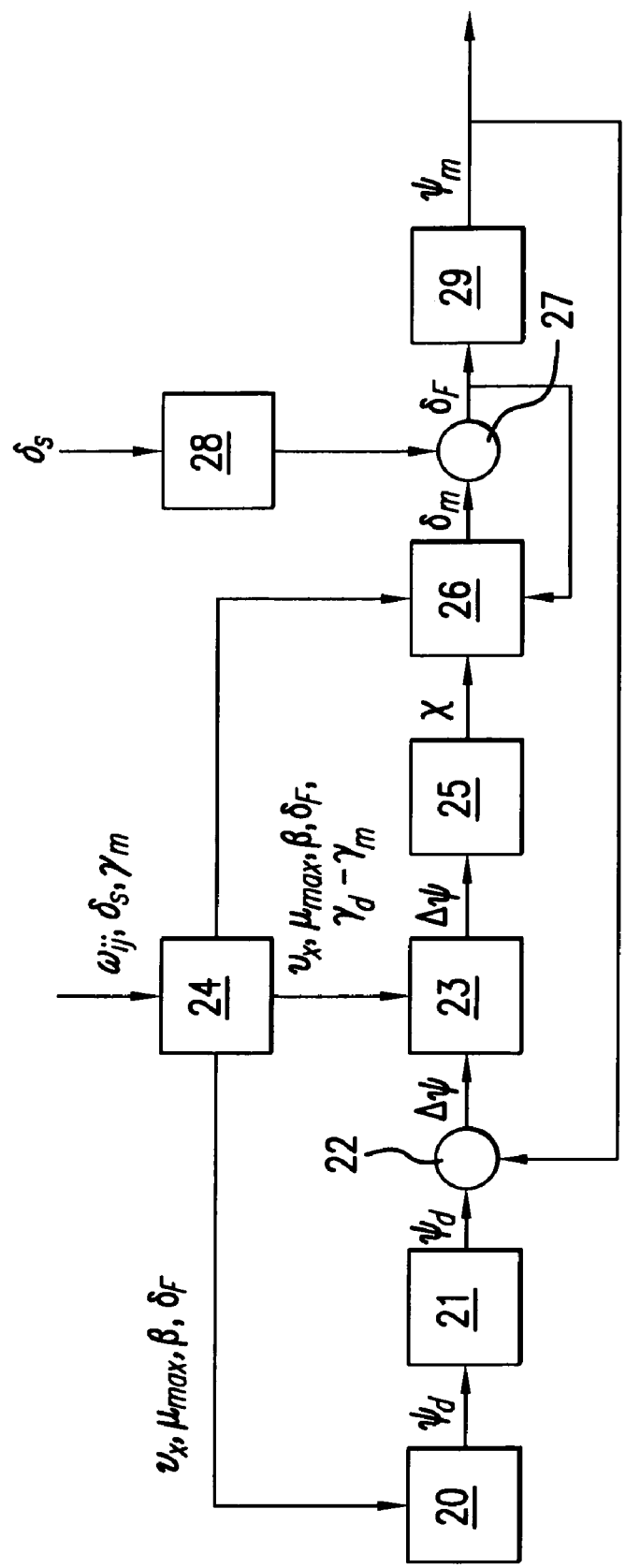
FIG. 3 shows a block circuit diagram for implementing a method of stabilizing the vehicle combination of towing vehicle and trailer.

FIG. 3 shows a block circuit diagram for carrying out the method. The first block 20 represents the kinematics of the system. Depending on the different state variables and parameters, especially the longitudinal speed of the vehicle $v_x$, the maximum friction $\mu_{max}$ between the wheels and the road, the attitude angle $\beta$ and the current wheel steering angle $\delta_F$, the nominal value $\Psi_d$ of the yaw rate is determined on the basis of the kinematic relationships in block 20. In the subsequent block 21, the dynamic vehicle behavior is modeled by means of filters with a frequency-dependent phase shift; the thereby obtained nominal value $\Psi_d$ of the yaw rate reflects the dynamic vehicle behavior.

For determining the control error, the assigned actual value $\Psi_m$ of the yaw rate is subtracted from the nominal value $\Psi_d$ of the yaw rate in the subsequent block 22. The difference $\Delta\Psi$ between the yaw rates is supplied to a subsequent block 23, as input value. In block 23, a limiter is realized, which has the task of limiting the difference $\Delta\Psi$ between the yaw rates with the help of a dead-time function in such a manner that, when the difference is below a threshold value, steering interventions are not carried out. Additionally or alternatively, the difference can also be capped at a maximum. The difference function is described in FIG. 4 and will be explained in detail there.

In addition, the longitudinal speed of the vehicle $v_x$, the maximum friction $\mu_{max}$, the attitude angle $\beta$, the wheel steering angle $\delta_F$, as well as the difference between the nominal value $\gamma_d$ and the actual value $\gamma_m$ of the trailer can flow into the limiting function in block 23 as input quantities. These state variables or parameters can be generated in a preceding block 24, in which an observer model is realized. The quantities sought are calculated on the basis of a mathematical model in the observer as a function of measured state variables or parameters, especially of the rpm of the wheels $\omega_U$, the steering angle $\delta_S$ specified by the driver, as well as the actual value $\gamma_m$ of the trailer angle.

The difference $\Delta\Psi$ of the yaw rate, limited in block 23, is supplied subsequently to block 25, which represents a controller. A process variable, which is generally referred to as a state variable x and is at the output of the controller, is generated in the controller. In particular, this state variable is a quantity, which characterizes the transverse dynamics of the vehicle combination, such as the yaw acceleration.

In the further course, the process variable or state variable x is supplied as input quantity to the block 26, in which a so-called inverse mathematical vehicle model is realized. Together with the controller in block 25, a nonlinear control formulation can be carried out, in which the controller is constructed as a compensation comptroller. If the inverse vehicle model in block 26 is of sufficient quality, the real vehicle, shown in FIG. 3 in block 29, is compensated and a linear control relationship results. State variables and parameters, generated by the observer model from block 24 are additional input quantities in block 26. In addition, the wheel steering angle $\delta_F$ is supplied as input quantity in a returning loop to the inverse vehicle model.

The inverse vehicle model supplies the superimposing steering angle $\delta_M$ as output quantity from block 26. In a subsequent block 27, which represents the superimposing steering gear of the superimposing steering system and is constructed, for example, as a planetary gear, this superimposing steering angle $\delta_M$ is added to the steering angle $\delta_S$, which is specified by the driver and converted in a block 28, which represents the steering gear. If superimposing steering is not provided in the steering system, block 27 can also represent a moment superimposition of an electric power steering (EPS).

The steering angle $\delta_1$ of the driver and the superimposition steering angle $\delta_M$ lead to a wheel steering angle $\delta_F$ or to a corresponding correcting variable (labeled S in FIG. 1), which is supplied as input quantity to an actuator in the real vehicle, which is represented in block 29. Thereupon, a desired actual value Ψ of the yaw rate sets in. If superimposing steering is provided, the correcting variable S is the nominal value of the superimposing steering angle $δ_M$.

The yaw angle Ψ, considered in FIG. 3, is, in particular, the yaw angle of the towing vehicle. Optionally, however, the yaw angle of the trailer or some other state variable also comes into consideration, especially a state variable representing the transverse dynamics of the system.

Figure 4:
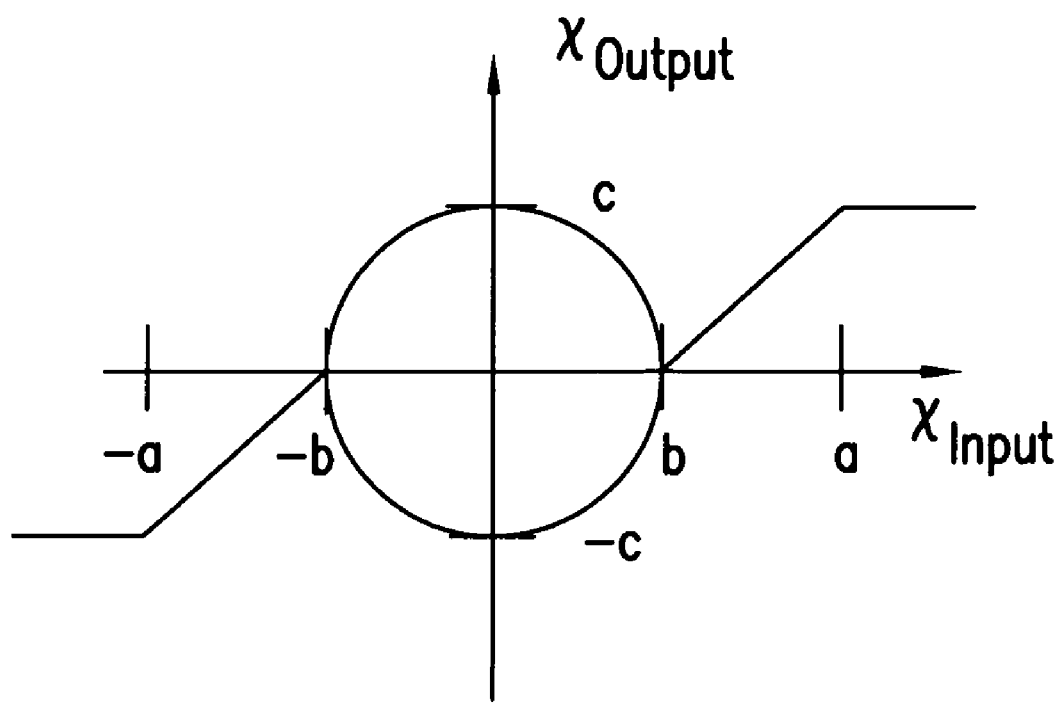
FIG. 4 shows a diagram with a limiting function, which can be used to limit the controller input and/or the controller output.

FIG. 4 shows a limiting function, which can be used for limiting the controller input in block 23 in FIG. 3 or the controller output in block 26 in FIG. 3. Input and output of the limiter in FIG. 4 is a state variable, which is generally labeled x and modulated corresponding to the limiting function. On the one hand, the state variable x can be subjected to a dead time, in that, below a threshold value b, the output of the state variable is set at 0 or at least a reduced value. The concept of "dead time" is not time-dependent here. Instead, it is to be understood generally as a reaction, which sets in with delay.

On the other, the state variable can be limited to a maximum value c. The increase to the maximum value c takes place after the expiration of the dead time at point b linearly between b and a further ordinate value a.

The values of a, b and c may be specified as fixed values in the limiter or calculated from vehicle state variables and/or parameters of the vehicle.

LIST OF REFERENCE SYMBOLS

1 Steering system
2 Steering wheel
3 Steering shaft
4 Superimposing gear
5 Servo motor
6 Steering gear
7 Steering linkage
8 Front wheel
9 Steering actuator
10 Vehicle combination
11 Towing vehicle
12 Trailer
13 Tow bar
$Ψ_m$ Actual value of yaw rate
$Ψ_d$ Nominal value of yaw rate
$ΔΨ$ Yaw rate difference
$Ψ_1$ Yaw angle of trailer
$Ψ_2$ Yaw angle of towing vehicle
γ Trailer angle
$γ_m$ Actual value of trailer angle
$γ_d$ Nominal value of trailer angle
$v_x$ Longitudinal speed of the vehicle
β Attitude angle
μ Friction
$μ_{max}$ Maximum friction
$δ_F$ Wheel steering angle
$δ_S$ Steering angle
$δ_S'$ Resultant steering angle
$δ_M$ Superimposition steering angle
$ω_y$ Rpm of wheels
S Control variable

The invention claimed is:

1. A method for stabilizing a vehicle-trailer combination which includes a towing vehicle and a trailer, the method comprising:
    determining an actual value of at least one state variable describing a corresponding state of the vehicle, the trailer or the vehicle-trailer combination, said at least one state variable including at least one process variable which describes a state of the trailer or at least one other process variable from which the state of the trailer can be derived;
    comparing said actual value of said at least one state variable with a nominal value of said at least one state variable corresponding thereto;
    producing a correcting variable based on said comparing; and
    causing said correcting variable to act upon a steering actuator for changing a relevant setting thereof based on said comparing and adjusting a wheel steering angle accordingly at least at one steerable wheel of the vehicle-trailer combination.

2. A method according to claim 1, wherein said at least one state variable includes a yaw rate.

3. A method according to claim 1, wherein said at least one state variable includes a trailer angle which describes an angular deviation between respective longitudinal axes of the towing vehicle and of the trailer.

4. A method according to claim 1, wherein the actual value of the at least one state variable is determined by measurement.

5. A method according to claim 4, wherein the actual value of the at least one state variable is calculated in an observer model.

6. A method according to claim 1, wherein a compensation control is employed using an inverse vehicle model.

7. A method according to claim 1, wherein the actual value of the at least one state variable is determined as a function of a vehicle longitudinal speed of the vehicle, an attitude angle and/or friction.

8. A method according to claim 1, further comprising limiting a difference between the actual value and the nominal value for said at least one state variable by employing a dead time function, wherein steering interventions are not carried out when the difference is below a threshold value.

9. A method according to claim 1, further comprising limiting a difference between the actual value and the nominal value for said at least one state variable to a maximum value with by employing a limiting function.

10. A steering system for implementing the method of claim 1, comprising:
    a device for manipulating the steering;
    a steering linkage; and
    a steering actuator.

11. A steering system according to claim 10, wherein:
    said system is constructed as an EPS (electrical power steering) system; and
    said steering actuator includes an electric motor.

12. The steering system according to claim 10, wherein said system includes an AFS (active front steering) system for adjusting a superimposing steering angle, which is superimposed on the steering angle specified by the driver.

13. A method according to claim 1, wherein stabilization of the vehicle-trailer combination is carried out by intervention of steering including said causing said correcting variable to act upon a steering actuator, and without requiring activation of a braking system of the vehicle-trailer combination.

14. A method according to claim 1,
    wherein said at least one state variable at least a respective one of a trailer angle or a trailer yaw angle.

15. A method according to claim 1, wherein said at least one steerable wheel of the vehicle-trailer combination includes at least one steerable wheel of the trailer.

16. A method for stabilizing a vehicle-trailer combination which includes a towing vehicle and a trailer, the method comprising:

determining an actual value of at least one state variable comprising at least one process variable from which transverse dynamics of at least one of the trailer or the vehicle-trailer combination can be inferred;

comparing said actual value of said at least one state variable with a corresponding nominal value of said at least one state variable;

producing a correcting variable based on said comparing; and adjusting a wheel steering angle of at least one steerable wheel of the vehicle-trailer combination based upon said correcting variable.

17. A method according to claim 16, wherein said adjusting includes causing said correcting variable to act upon a steering actuator.

18. A method according to claim 16, wherein said at least one process variable relates to a driving state of at least one of said vehicle, said trailer or said vehicle-trailer combination.

19. A method according to claim 16, wherein said at least one steerable wheel is at least one steerable wheel of the vehicle.

20. A method according to claim 19, wherein stabilization of at least one of said trailer or said trailer combination is effected by said adjusting the wheel steering angle of the at least one steerable wheel of the vehicle.

* * * * *